(12) United States Patent
Von Beuningen et al.

(10) Patent No.: US 11,420,568 B2
(45) Date of Patent: Aug. 23, 2022

(54) DISPLAY ASSEMBLY FOR A MEANS OF TRANSPORT

(71) Applicant: Bayerische Motoren Werke Aktiengesellschaft, Munich (DE)

(72) Inventors: Sven Von Beuningen, Munich (DE); Martin Veith, Poing (DE); Christoph Schmalz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/733,237

(22) PCT Filed: Nov. 14, 2018

(86) PCT No.: PCT/DE2018/100928
§ 371 (c)(1),
(2) Date: Jun. 15, 2020

(87) PCT Pub. No.: WO2019/120367
PCT Pub. Date: Jun. 27, 2019

(65) Prior Publication Data
US 2021/0221300 A1     Jul. 22, 2021

(30) Foreign Application Priority Data

Feb. 20, 2017   (DE) ..................... 10 2017 223 399.0

(51) Int. Cl.
*G09G 3/20* (2006.01)
*B60R 11/02* (2006.01)
(Continued)

(52) U.S. Cl.
CPC ........ *B60R 11/0229* (2013.01); *G09G 3/2096* (2013.01); *H04L 12/40* (2013.01);
(Continued)

(58) Field of Classification Search
CPC ........ B60R 11/0229; B60R 2011/0028; G09G 3/2096; G09G 2380/10; H04L 12/40; H04L 2012/40273
See application file for complete search history.

(56) References Cited

U.S. PATENT DOCUMENTS 8,508,673 B2 *   8/2013   Perlman .......... B64D 11/00152
                                                          725/77
9,297,721 B2 *   3/2016   Bertosa ................. G06Q 10/20
(Continued)

FOREIGN PATENT DOCUMENTS

DE          29608032 U1       8/1996
DE      102014104567 A1      10/2015
(Continued)

*Primary Examiner* — Towfiq Elahi
(74) *Attorney, Agent, or Firm* — 2SPL Patent Attorneys PartG mbB; Kieran O'Leary

(57) ABSTRACT

A display assembly for a means of transport and a correspondingly equipped means of transport are disclosed. The display assembly includes a display unit, a bus subscriber and a housing comprising a data interface arranged at its outside, and a mechanical interface for fixing the housing in the means of transport, wherein the display unit and the bus subscriber are arranged in the housing and the bus subscriber is configured to be connected by information technology to a bus of the means of transport via the data interface.

10 Claims, 2 Drawing Sheets

(51) Int. Cl.
*H04L 12/40* (2006.01)
*B60R 11/00* (2006.01)

(52) U.S. Cl.
CPC .. *B60R 2011/0028* (2013.01); *G09G 2380/10* (2013.01); *H04L 2012/40273* (2013.01)

(56) References Cited

U.S. PATENT DOCUMENTS

| | | | | |
|---|---|---|---|---|
| 2008/0040756 | A1* | 2/2008 | Perlman | B64D 11/00152 725/75 |
| 2014/0215491 | A1* | 7/2014 | Addepalli | H04W 52/0219 719/313 |
| 2016/0381059 | A1* | 12/2016 | Galula | H04L 63/02 726/23 |
| 2017/0359519 | A1* | 12/2017 | Hardy | H04N 5/44 |

FOREIGN PATENT DOCUMENTS

| | | |
|---|---|---|
| DE | 102017112315 A1 | 12/2017 |
| WO | 2008066972 A2 | 6/2008 |

\* cited by examiner

DISPLAY ASSEMBLY FOR A MEANS OF TRANSPORT

The present invention relates to a display assembly for a means of transport and a means of transport equipped with such a display assembly. In particular, the present invention relates to the possibility of a simplified installation of display assemblies in means of transport and a positioning of display assemblies in places in means of transport which are difficult to access.

For driver information and/or for the entertainment of passengers of a means of transport, display units are increasingly being installed, which are fixed in the interior of the means of transport. In current vehicles, each indicating control device (e.g., central information display (CID), instrument cluster, rear seat entertainment system) uses one display or more displays. These control devices have automotive interfaces to the on-board network of the means of transport. Via the on-board network, the control devices receive vehicle data, determine relevant display contents, create (render) corresponding display contents and output the same via a line. Via the line, the display contents reach the respective destination displays. In the state of the art, the raw data is transmitted, for example, via bus systems (MOST, CAN, or the like) to the control device and via graphics-specific cables (e.g., APIX, HDMI or the like) further on to the respective screen.

The integration of a new display area for displays or operating elements in the means of transport always involves the need for an additional complex control device or a more powerful variant of an existing control device. In this way, considerable costs are incurred in the means of transport. If additional control devices are to be integrated into the means of transport, new interfaces for data communication are often to be developed and provided.

It is an object of the present invention to simplify the integration of additional display areas in the means of transport and/or to make it possible at a lower cost. In particular, it is an object of the present invention to facilitate display areas in places/positions in the means of transport which are difficult to access.

The above-mentioned object is solved according to the invention by a display assembly for a means of transport. The means of transport may be, for example, a car, a van, a truck, an aircraft and/or a watercraft. The display assembly may be understood as a compact, especially rigid, mounting unit, which comprises a display unit and a bus subscriber. Both are accommodated in one housing. The display unit may be understood as the assembly which is capable of outputting graphical contents to a user by appropriate control. The bus subscriber is configured to receive information to be displayed via a bus of the on-board network of the vehicle. For this purpose, the housing comprises a data interface at its outside. The same may be designed as a plug connection. In addition, the housing comprises a mechanical interface by means of which the housing may be fixed in the interior of the means of transport. For example, the mechanical interface may be configured to fix the display assembly in a steering wheel and/or in a headlining and/or a headrest of the means of transport. The display assembly provided in this way might also be called a "smart display" because no external control device is required to receive the information to be displayed. Rather, according to the present invention, the display assembly contains any processing devices which prepare graphical contents for display on the display unit from the information received via the bus subscriber and/or via the data interface (e.g., raw data interface, in contrast to graphics-specific cables such as APIX, HDMI, or the like). This offers the possibility of a flexible expansion of the display area in a means of transport, which means that a variety of variants may be offered at low cost. In particular, by dispensing with an external graphic data interface, inventive display assemblies may be accommodated in places in the means of transport in which conventional display assemblies may not be arranged.

The subclaims show preferred further embodiments of the invention.

The data interface may include an Ethernet interface, for example. In particular, the data interface may consist of an Ethernet interface. The Ethernet interface may comprise a snap/latch connection. The Ethernet interface may comprise an RJ45 plug connector. Accordingly, the bus subscriber is configured as an Ethernet subscriber. In this way, a proven and low-cost form of communication may be used for information transmission for the display assembly.

In particular, in case the data interface is designed without CAN and/or MOST interface, the cable cross sections and the number of required individual lines may be drastically reduced. In this way, even inaccessible positions in the interior of the means of transport may be provided with a display assembly according to the invention and the display assembly may be supplied with the required information.

The housing may be implemented in two parts to allow a predefined mobility of the display unit in relation to the vehicle interior. For example, the display unit may, for this purpose, be arranged in a first part of the housing, while the mechanical interface is arranged in a second part of the housing. In this way, the display unit may be fixed in the means of transport in a displaceable and/or pivotable manner. Due to the respective guidance between the two parts, such a (housing) unit is also to be understood as "rigid" according to the present invention.

With the (at least) two-part version of the housing, the bus subscriber may be located in the same housing part as the display unit. Alternatively or additionally, the data interface may be arranged in the same housing part as the display unit. In other words, the data interface is exposed either on the outside of the first housing part or on the outside of the second housing part, and may be contacted directly through a connector of the vehicle wire harness or bus system, respectively.

The mechanical interface may include, for example, a clip connection and/or a screw connection and/or a snap/latch connection. In this way, assembly procedures may be simplified and durable and acoustically unproblematic connections may be achieved.

The display module according to the invention may preferably also include an evaluation unit which is set up to receive data via the data interface and to process (e.g., render) the for display on the display unit. In particular, the data may concern the operational state of the means of transport. In the same way, the display assembly according to the invention may also comprise an input unit (e.g., in the form of a touch-sensitive surface and/or in the manner of a touch screen), by means of which user inputs may be received and output to the on-board network of the means of transport via the evaluation unit and the data interface. This information, in turn, may be used to influence the operating state of the means of transport. In other words, the simplified topology of the display assembly according to the invention may be used bidirectionally with regard to the flow of information.

The evaluation unit may also be located in the housing. If the housing is configured in two parts (as described above), the evaluation unit may be arranged in the first housing part and/or in the second housing part. In this way, a flexible positioning results depending on the space requirement and/or the need to cool down the evaluation unit.

The bus subscriber and the display unit may be connected to each other via an on-chip connection. In particular, an information technology connection may be provided between the display unit and the bus subscriber exclusively via an on-chip connection. In other words, the display unit may be arranged on a board on which the bus subscriber is also arranged. In this way, an extensive insulation may be avoided, as may cable breaks due to bending stresses, etc.

According to one aspect of the present invention, a display assembly (in the form of a smart display) is proposed which is equipped with a System on Chip (SOC) having a central processing unit (evaluation unit, CPU) and an integrated graphics processing unit (GPU). In particular, the display assembly may be equipped with a 3d renderer, which is especially provided as the only application in the smart display. In this way, a separation between logic and the display may be achieved. The logic may be easily centralized due to the low computational effort, whereas the rendering is most effectively implemented directly at the displaying control device. In other words, there may be a control device that provides the logic and a displaying control device that has a graphics processor and a screen.

According to one aspect of the present invention, a motherboard and a display are provided as independent units. "Independent" means that there may be a design in which the motherboard (with graphics processor, memory) and the aforementioned data interface are not set-up as a single unit. This means that the only connection between the two is through the APIX cable, for example. A possible interface for information transmission between the two is the APIX. In this way, the board may be used several times.

According to one aspect of the present invention, the motherboard and the display form a unit without an additional (flexible) interface. The inventive display assembly (Smart Display) may comprise a return channel for multimodal user interaction. For this purpose, an input unit for the reception of touch gestures, gestures performed freely in space or the like may be integrated in the housing.

The present invention allows the arbitrary distribution of display area in the means of transport in order to provide the user with novel operating concepts. By designing a Smart Display without automotive interfaces, additional costs may be saved. This approach enables good scalability for different customer functions.

According to another aspect of the present invention, a means of transport is proposed which comprises a display assembly according to the above-mentioned embodiments. The means of transport may be configured, for example, as a car, a van, a truck, an aircraft and/or a watercraft. The features, combinations of features and the advantages resulting from the same obviously correspond to those of the above-mentioned aspects and reference is made to the above explanations in order to avoid repetition.

Further details, features and advantages of the invention result from the following description and figures, in which.

Figure 1:
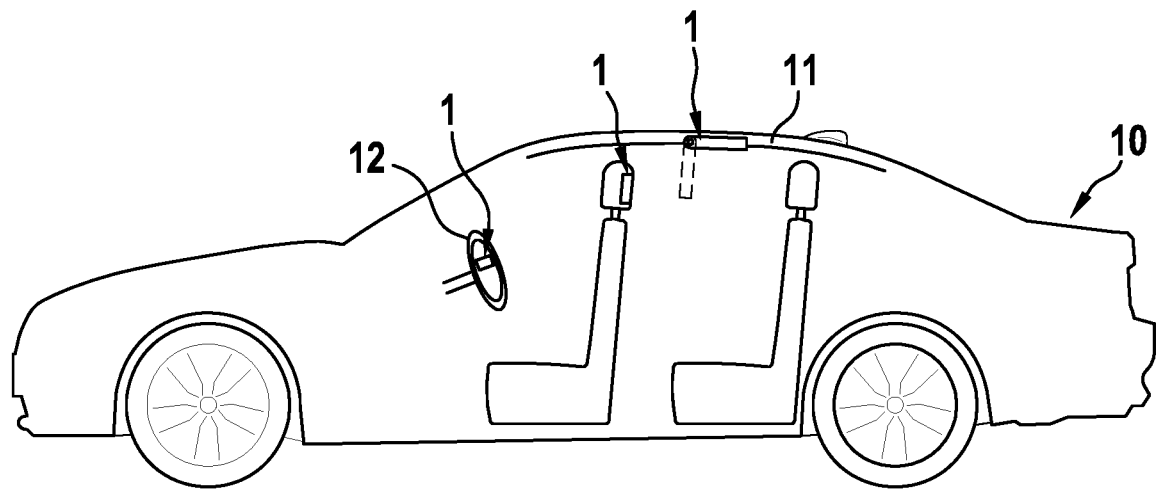
FIG. 1 shows a schematic side view of an embodiment of a means of transport according to the invention.

FIG. 1 shows a car 10 as an embodiment of a means of transport according to the invention, which illustrates different positions for display assemblies 1 according to the invention. A first display assembly 1 is integrated in the headrest of the driver's seat. A second display assembly 1 is integrated into the steering wheel 12. A third display assembly 1 is integrated into the headlining 11 of the means of transport 10 and has a swing-out display unit. Possible configurations of display assemblies 1 are described in detail in connection with the following figures.

Figure 2:
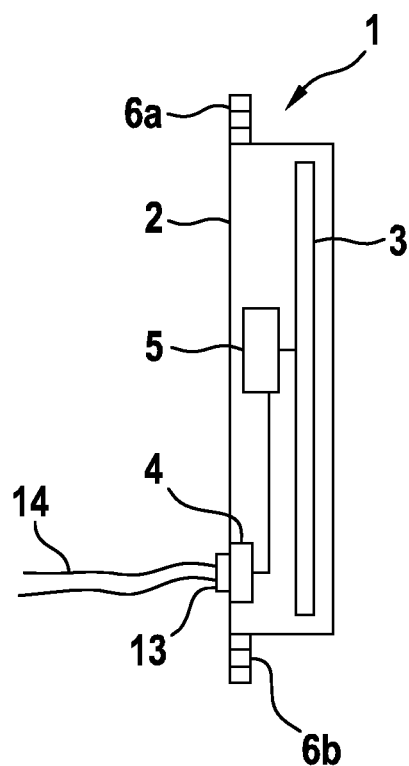
FIG. 2 shows a first embodiment of a display assembly according to the invention with a compact, one-part housing.

FIG. 2 shows a cut-out side view of a first embodiment of a display assembly 1 according to the invention. The housing 2 is configured to be compact and rigid. The mechanical fixing of the display assembly 1 is done by eyelets 6a, 6b as an embodiment of a mechanical interface. The eyelets 6a, 6b may be used to fix the housing 2 for example in the steering wheel 12 or in the headrest of the means of transport. An Ethernet connector 13, as a vehicle-side interface, is connected to the housing 2 of the display assembly 1 via a wire harness 14, wherein the same is received by a data interface 4 at its outside. From the data interface 4, the information is transmitted to a bus subscriber 5, which also comprises an evaluation unit (not shown separately) for generating displayable contents. The rendered contents are transferred from the evaluation unit to the display unit in the form of a matrix display 3. The matrix display 3 may comprise a (non-illustrated) touch-sensitive and/or capacitive surface for receiving user inputs, which reach the wire harness 14 in reverse order.

Figure 3:
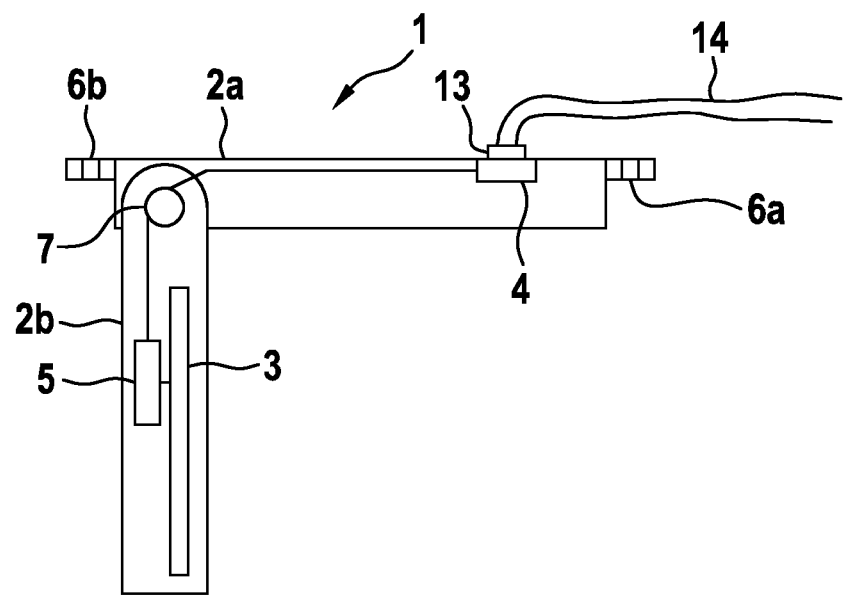
FIG. 3 shows a second embodiment of a display assembly according to the invention having a two-part housing.

FIG. 3 shows a second embodiment of a display assembly 1 according to the invention, in which the housing is divided into a first part 2a and a second part 2b. The housing parts 2a, 2b may be swiveled relative to each other via a hinge 7. The data interface 4 is arranged in the first housing part 2a to accommodate the Ethernet connector 13. In addition, the eyelets 6a, 6b for fixing the display assembly in the headlining 11 of the means of transport 10 are arranged on the outside of the first housing part 2a. The bus subscriber 5, the evaluation unit and the display unit 3 are arranged in the second housing part 2b, so that the display unit 3 may be either brought out or stowed away.

Figure 4:
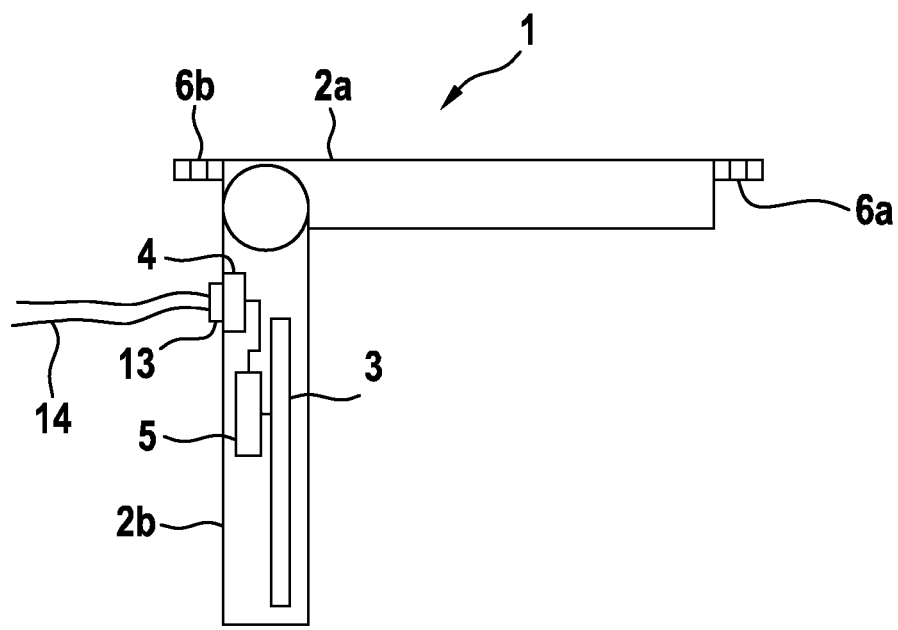
FIG. 4 shows a third embodiment of a display assembly according to the invention with a two-part housing.

FIG. 4 shows a third embodiment of a display assembly 1 according to the invention, in which any electronic components are arranged in the second housing part 2b. In other words, the Ethernet connector 13 is plugged into a data interface 4 arranged on the outside of the second housing part 2b, so that any lines are arranged in the second housing part 2b and no mechanical stress caused by the movement of the two housing parts 2a, 2b relative to each other is to be expected.

LIST OF REFERENCE NUMERALS 1 display assembly
2 housing
2a first housing part
2b second housing part
3 matrix display
4 data interface
5 bus subscriber with evaluation unit
6a, 6b eyelet
7 hinge
10 car
11 headlining
12 steering wheel
13 Ethernet connector
14 wire harness

The invention claimed is:

1. A display assembly for a means of transport, comprising:
   a display unit,
   a bus subscriber, wherein the bus subscriber renders three-dimensional content for the display unit, and
   a housing comprising:
      a data interface arranged at its outside, and
      a mechanical interface for fixing the housing in the means of transport,
   wherein the display unit and the bus subscriber are arranged in the housing and the bus subscriber is configured to be connected by information technology to a bus of the means of transport via the data interface.

2. The display assembly according to claim 1, wherein the data interface comprises an Ethernet interface.

3. The display assembly according to claim 1, wherein a CAN and/or a MOST interface are not included in the data interface.

4. The display assembly according to claim 1,
   wherein a first part of the housing and a second part of the housing are configured to be displaceable and/or pivotable relative to one another,
   wherein the mechanical interface is arranged in the first part of the housing and the data interface is arranged in the second part of the housing.

5. The display assembly according to claim 1,
   wherein a first part of the housing and a second part of the housing are configured to be displaceable and/or pivotable relative to one another,
   wherein the mechanical interface is arranged in the first part and the data interface is also arranged in the first part of the housing.

6. The display assembly according to claim 1, the mechanical interface comprising
   a clip connection, and/or
   a screw connection, and/or
   a snap/latch connection.

7. The display assembly according to claim 1, further comprising an evaluation unit comprising a processor, the processor configured to receive data
   concerning an operating state of the means of transport via the data interface and to render same for display on the display unit.

8. The display assembly according to claim 7, wherein the evaluation unit is arranged in the housing.

9. The display assembly according to claim 1, wherein the mechanical interface is provided for fixing the display assembly in:
   a headlining, and/or
   a steering wheel, and/or
   a headrest.

10. A vehicle comprising a display assembly according to claim 1.

* * * * *